United States Patent [19]

Weman

[11] Patent Number: 4,915,414
[45] Date of Patent: Apr. 10, 1990

[54] SEAT BELT ANCHORAGE

[75] Inventor: Per-Olof Weman, Heverlee, Belgium

[73] Assignee: General Engineering (Netherlands) B.V., Utrecht, Netherlands

[21] Appl. No.: 191,032

[22] Filed: May 6, 1988

[30] Foreign Application Priority Data

May 8, 1987 [SE] Sweden .................................. 8701922

[51] Int. Cl.$^4$ .............................................. B60R 22/24
[52] U.S. Cl. ..................... 280/801; 296/209
[58] Field of Search ............... 280/808, 802, 804, 801; 297/483, 468, 469; 296/209, 199, 193, 203, 151; 49/467

[56] References Cited

U.S. PATENT DOCUMENTS

| 1,804,658 | 5/1931 | Tarbox | 296/209 |
| 4,394,050 | 7/1983 | Spooner | 280/801 |
| 4,451,060 | 5/1984 | Sylvén | 280/801 |
| 4,475,746 | 10/1984 | Akiyama | 280/808 |

FOREIGN PATENT DOCUMENTS

| 1150896 | 6/1963 | Fed. Rep. of Germany | 280/801 |
| 2003020 | 3/1979 | United Kingdom | 280/808 |
| 2077573 | 12/1981 | United Kingdom | |

Primary Examiner—Charles A. Marmor
Assistant Examiner—Karin Tyson
Attorney, Agent, or Firm—Spencer & Frank

[57] ABSTRACT

A seat belt anchorage is provided for a seat belt for use to protect a person sitting in a front seat of a two-door vehicle. The anchorage comprises a slider bar mounted in the interior of the vehicle adjacent the door sill and extending in the longitudinal direction of the vehicle. One end of the seat belt is slidably attached to the bar. The bar is adapted to be moved towards the sill when the slider bar is subjected to a force from above so that the distance between the slider bar and the sill is reduced. This minimizes any risk of a person catching a shoe heel between the slider bar and the sill.

20 Claims, 3 Drawing Sheets

PRIOR-ART

PRIOR-ART

PRIOR-ART

SEAT BELT ANCHORAGE

BACKGROUND TO THE INVENTION

THE PRESENT INVENTION relates to a seat belt anchorage and more particularly to a seat belt anchorage for a seat belt provided for use by a driver or front seat passenger of a two-door vehicle.

In a two-door vehicle, such as a car having only one door on each side, where a three-point seat belt is utilised it is not convenient to arrange a fixed floor anchorage for one end of the belt on the floor adjacent the front seat, between the front seat and the door. Although, for safety reasons, it is desired to have one end of the belt in this location when the belt is in use, if one end of the belt is permanently anchored in this position, then, when the belt is not in use, and when the strap portion of the belt has been retracted into the retractor reel, part of the seat belt will extend across the door opening and this will impede access to and from the rear seat. Because a part of the strap will extend across the lower rear corner of the door opening, there will be a risk that passengers will trip on the belt when getting into or when getting out of the rear seat of the car.

SUMMARY OF THE PRIOR ART

It has been proposed previously to provide an example of such an anchorage is disclosed in U.K.-A-2003020. In this prior arrangement a slider bar is utilised which is located in position in the motor vehicle to extend longitudinally of the vehicle adjacent and below the door sill. One end of the safety belt is formed into a loop which slides along the bar. This end of the belt is thus movable between a front position, in which the end of the belt is located beside the front seat, this being the position adopted by the end of the belt when the safety belt is in use, and a rear position, located behind the front seat, which is the position taken by the end of the belt when the safety belt is not in use.

Because the slider bar passes through the loop formed at the end of the belt, the loop is automatically moved along the slider bar to the front position when the seat belt is fastened around a passenger or driver, and is automatically moved to the rear position, when the seat belt is not in use, as the rest of the belt is retracted by the retractor reel. Thus, at all times, the end of the belt is conveniently positioned. The end of the belt is in the correct position, from the safety point of view, when the seat belt is in use, and the safety belt does not extend across the door opening when the seat belt is not in use.

Various prior art devices of this type have been proposed, but all of the prior art devices suffer from the disadvantage that there is a risk that a high-heel on a ladies shoe, for example a so-called stilleto heel, may get caught in the space between the slide bar and the adjacent door sill. If a heel does become caught in this way there is a significant risk that the lady wearing the shoe will be tripped up and may suffer injury.

OBJECT OF THE INVENTION

The present invention seeks to provide an anchorage point for a safety belt, of the type generally described above in which the risk of a thin heel getting caught in the space between the slide bar and the adjacent door sill is reduced to a miminum or is completely eliminated.

SUMMARY OF THE INVENTION

According to this invention there is provided an anchorage for a seat belt for use to protect a person sitting in a front seat of a two-door vehicle, said anchorage comprising a slider bar mounted in the interior of the vehicle adjacent the door sill and extending in the longitudinal direction of the vehicle, one end of the seat belt being slidably attached to the bar, so that the end of the belt can slide between a front position, adopted when the seat belt is in use, and a rear position, adopted when the seat belt is not in use, wherein the slider bar is adapted to be moved towards the sill when the slider bar is subjected to a force from above, so that the distance between the slider bar and the sill is reduced.

Preferably the upper portion of the slider bar defines a substantially planar surface, the planar surface being inclined to the horizontal, the normal to the planar surface being directed upwardly and away from the door sill.

Conveniently the planar surface is inclined to the horizontal at an angle of approximately 45°.

Advantageously at least one end of the slider bar is resiliently mounted in position.

Conveniently at least said one end of the slider bar is provided with a supporting arm, the supporting arm being mounted on the sill in such a way that the supporting arm can tilt towards the sill but cannot tilt away from the sill.

Preferably the supporting arm terminates in a ring-shaped element defining an aperture, the shank of a bolt passing through the aperture to secure the ring-shaped element in position, there being a projection spacing part of the ring-shaped element from a fixed part of the support and there being a resilient element adjacent the ring-shaped element, the arrangement being such that the ring-shaped element can tilt in one direction, with the resilient element being compressed, to enable the slider bar to move towards the sill, but cannot tilt in the opposite direction due to the effect of the projection.

Advantageously the projection comprises a protruding lip provided on the ring-shaped terminal element of the supporting arm.

Conveniently substantially identical supporting arms are provided at each end of the slider bar.

Preferably the central or longitudinal axis of the slider bar is positioned between the sill and a vertical plane passing through the point at which the bar is mounted to the vehicle.

Conveniently the upper portion of the door sill is provided with a lip projecting towards the interior of the vehicle and at least partially covering the space between the slider bar and the sill.

BRIEF DESCRIPTION OF THE DRAWINGS

In order that the invention may be more readily understood, and so that further features thereof may be appreciated, the invention will now be described, by way of example, with reference to the accompanying drawings in which.

DESCRIPTION OF PREFERRED EMBODIMENT

Figure 1:
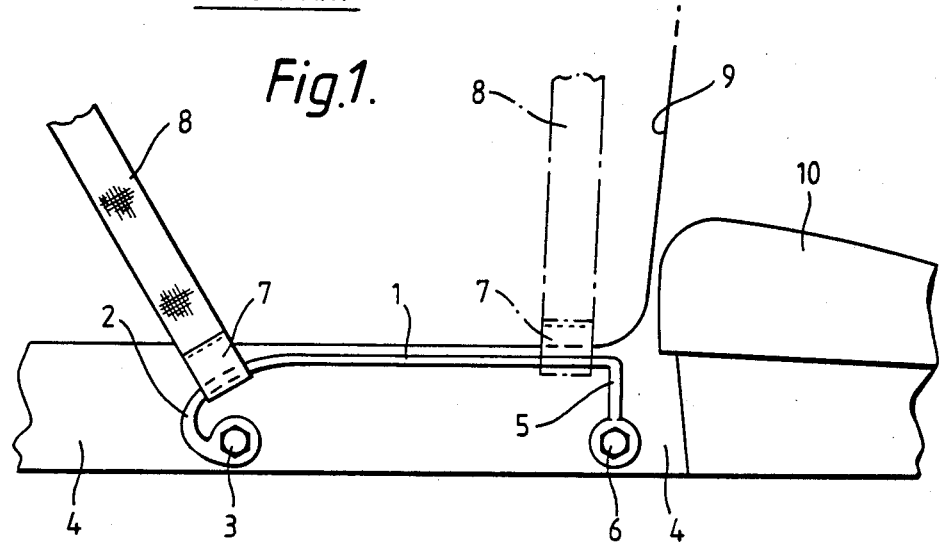
FIG. 1 is a schematic elevational view of a prior art anchorage, illustrating the front and rear positions of one end of the seat belt.
Figure 2:
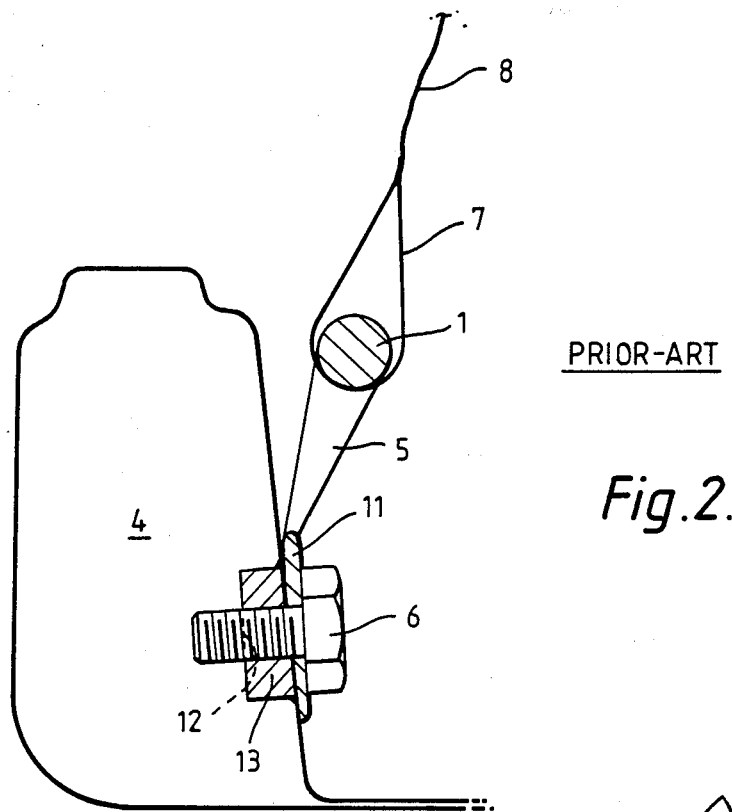
FIG. 2 is a cross-sectional view of the anchorage shown in FIG. 1.
Figure 3:
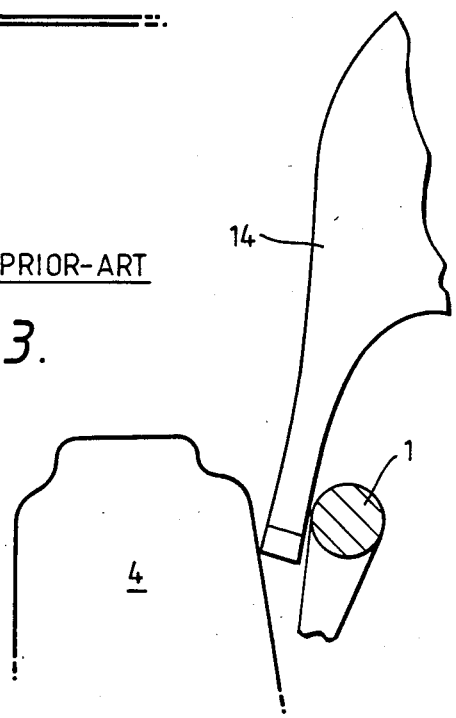
FIG. 3 illustrates a high heel on a ladies shoe getting caught in the space between the slider bar and the adjacent sill of the arrangement shown in FIGS. 1 and 2.

Referring initially to FIGS. 1 to 3, a prior proposed anchorage for a safety belt comprises an elongate bar 1 mounted in the motor vehicle to extend longitudinally of the vehicle.

The front end of the bar is curved or bent to form a mounting arm 2. The free end of the arm 2 defines an aperture through which passes a bolt 3 to secure the end of the arm to a door sill 4. The bolt 3 is located below the level of the horizontal bar 1. The rear end of the bar 1 is also bent downwardly to form a supporting arm 5 provided with an aperture through which passes a bolt 6 which secures this arm also to the door sill 4.

A loop 7 formed at one end of a safety belt 8 encircles the horizontal bar 1. The loop 7 is such that the belt 8 may be moved from a forward position, shown in solid lines in FIG. 1, to a rear position, shown in dotted lines in FIG. 1.

It can be seen that the slider bar 1 is mounted on the door sill 4 of a motor vehicle in alignment with a door opening 9 which is located in front of a rear seat 10. Thus, effectively, the slider bar 1 is mounted adjacent the front seat of the motor vehicle, which is not shown in FIG. 1 for the sake of clarity of illustration. However, it will be understood that when the safety belt is in use the belt will occupy the solid line position shown in FIG. 1, whereas when the belt is no longer in use, and the free length of belt has been withdrawn into the conventional retractor reel, the belt will occupy the position shown in dotted lines in FIG. 1. In this position the belt does not obstruct a significant part of the door opening, and thus the belt does not provide an obstruction to a person entering or leaving the rear seat of the vehicle.

As shown more clearly in FIG. 2, the rear supporting arm 5 of the slider bar 1 terminates in a ring-shaped portion 11 which defines a central aperture through which passes the shank 12 of the securing bolt 6, the shank passing into a threaded bore of a mounting member 13 which is positioned within the sill 4. However, the front supporting arm 2 is of the same design.

As can be seen from FIG. 2, the central axis of the horizontal part of the slider bar 1 is located at a greater distance from the sill than is the ring-shaped part 11. Also the axis of the horizontal part of the slider bar 1 is located on the side of a vertical plane passing through the ring-shaped part 11 is remote from the door sill 4. Thus, if the horizontal portion of the slider bar 1 is subjected to any pressure from above the horizontal part of the slideer bar would tend to move away from the sill. Since the supporting arms 2 and 5 are inevitably slightly resilient, when the slider bar is subjected to a downward force, the space between the slide bar 1 and the sill 4 will be slightly increased.

As can be seen from FIG. 3 if a ladies shoe heel 14 engages the slider bar 1, the slider bar 1 may move away from the door sill thus providing sufficient space to catch the free end of the heel 14. This may cause a lady wearing the shoe to trip and injure herself if she is getting into the car of if she is getting out of the car.

Figure 4:
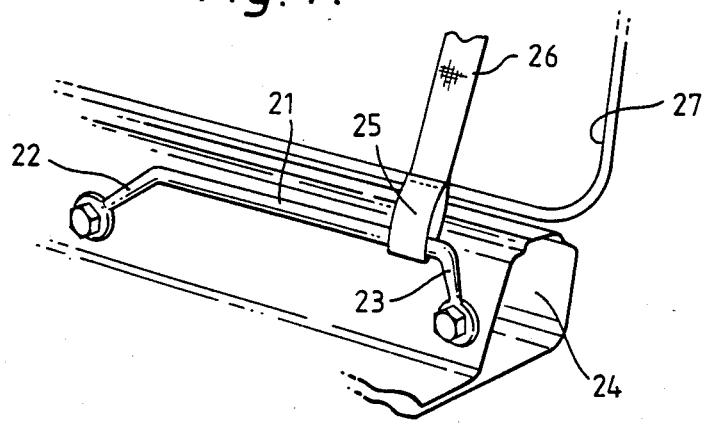
FIG. 4 is a perspective view of an embodiment of an anchorage in accordance with the invention.
Figure 5:
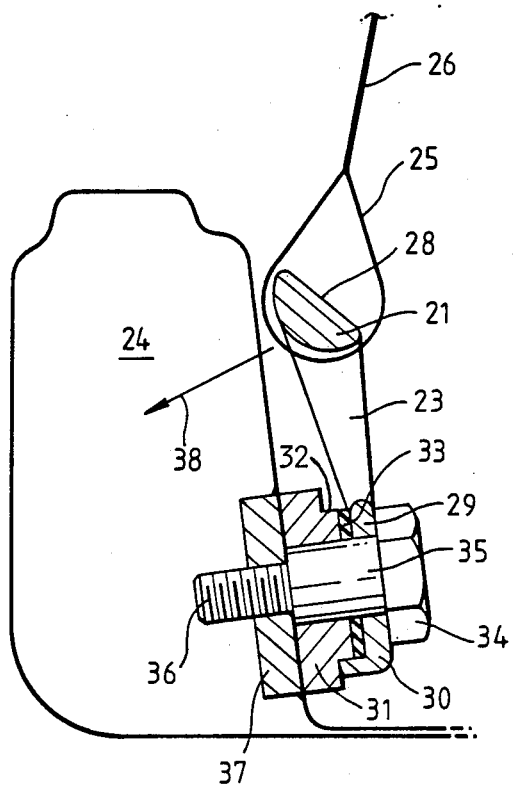
FIG. 5 is a sectional view of the embodiment shown in FIG. 4
Figure 6:
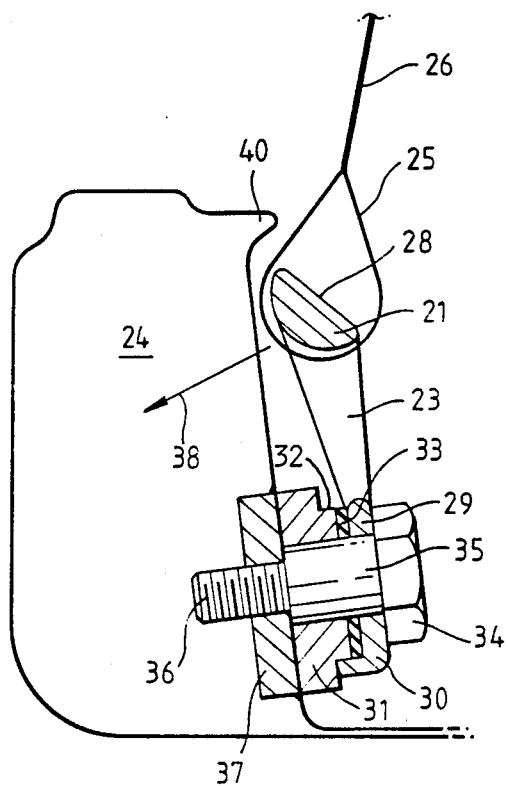
FIG. 6 is a view corresponding to FIG. 5 illustrating a modified embodiment of the invention.

FIGS. 4 to 6 illustrate an embodiment of the invention.

In the invention, a slider bar 21 has a central horizontal portion, the forward end of which forms a downwardly extending support arm 22 and the rear end of which forms a downwardly extending support arm 23. The support arms 22,23 are connected to a door sill 24 in the same way, and the arrangement mounting the support arm 23 to the door sill is shown in cross-section in FIG. 5.

As can be seen, from FIG. 4, however, the slider bar 21 is encircled by a loop 25 formed at one end of the seat belt 26, and the slider bar is positioned on the door sill 24 adjacent a door opening 27 in a motor car. It will thus be appreciated that the slider bar 21 and the associated safety belt 26 will operate in the same way as a slider bar 1 and the associated safety belt 8 as described with reference to FIG. 1.

Referring now to FIG. 5 it is to be noted that the horizontal portion of the slider bar 21 is not of circular cross-section, but instead is of semi-circular cross-section, presenting a substantially planar face 28 which is inclined at substantially 45° to the horizontal, the normal to the face 28 being directed upwards and away from the door sill 24.

The support arm 23 for the slider bar 21 terminates in an annular flat ring-like portion 29 which defines a central aperture.

The portion 29 terminates, adjacent its lower edge, with a forwardingly extending lip or flange 30.

Located adjacent the portion 29 is a support member 31 of circular form, having a circular projection or boss 32. The lip 30 engages the edge of this projection 32.

A washer 33 of resilient material, such as, for example, rubber is located between the portion 29 and the projection 32. A bolt 34 is provided, which has a tubular spacing element 35 surrounding part of the shank 36 of the bolt. The tubular spacing element passes through the annular element 30, the washer 33, and the member 31. The threaded shank of the bolt 36 passes into a threaded bore formed in a supporting block 37 which is mounted in the sill 24.

It will be appreciated that if the upper horizontal part 21 of the slider bar tends to move outwardly the ring-shaped element 30 will tend to pivot about the axis of the bolt 35, but the lip 30 will engage the supporting member 31, and since the main part of the ring-shaped portion 29 engages the head of the bolt, it will not be possible for the main part 21 of the slider bar to move away from the sill 24. However, if the slider bar tends to move in towards the sill, in the direction of the arrow 38 shown in FIG. 5, the resilient washer 33 will compress, thus permitting the slider bar to move in slightly in the direction of the arrow 38.

It will be observed that since the slider bar 21 has the inclined planar face 28, if a downward force is applied to the face 28, a resultant force will be generated, effective in the direction of the arrow 38. This is partly because of the nature of the inclined face 28, and partly because the inclined face is located, with regard to a vertical plane passing through the ring-shaped portion 29, on the side of that plane towards the sill 24.

It will thus be appreciated that there is only a very small chance that the heel of a shoe will become caught between the slider bar 21 and the sill 24. However, FIG. 6 illustrates a further modified embodiment of the invention, in which the same reference numerals are used for the same parts as shown in FIG. 5. It will be seen that in the embodiment shown in FIG. 6 the door sill 24 is provided with an outwardly extending rib or projection immediately above a slider bar 21, thus minimising the risk of a shoe heel being inserted in the gap between the slider bar 21 and the sill 24.

Whilst essentially one embodiment of a slider bar in accordance with the invention has been described, many variations and modifications are possible within the scope of the invention.

For example, it is possible for only the front end of the slider bar to be attached resiliently to the sill in the manner described. The rear end of the slider bar may be rigidly attached to the sill. In such a case only the front portion of the slider bar can move towards the sill when subjected to downward pressure, but the rear end of the slider bar may sometimes be positioned so close to the door sill that there is no real risk of a heel engaging the gap between the slider bar and the door sill in that region of the slider bar.

The precise technique for mounting the front and rear end of the slider bar in position may be altered significantly, provided that at least the front end of the slider bar may move in towards the sill.

The resilient washer 33 may be of rubber or any other resilient material or may be replaced by a coil spring. The resilient washer may, alternatively, be located immediately adjacent the head of the bolt, between the head of the bolt and the ring-like end 29 of the slide bar. In such an embodiment a protusion will be provided on the upper part of the ring-shaped end 29 of the slide bar adapted to engage the inner side of the head of the bolt.

In certain circumstances it may not be necessary to provide a spacing means, such as the element 31, to space the slide bar from the interior wall of the sill, especially if the interior wall of the wall is inclined. In such a case, the end of the slide bar may be attached directly to the wall of the sill, with the central axis of the horizontal part of the slide bar nevertheless being positioned on the desired side of the vertical plane passing through the mounting point.

The mounting points for the slider bar may be positioned above a slider bar, but this has the disadvantage that the slider bar must have a stronger design, so that it can better withstand the forces occurring during accidents. In such a case, the forces are compressive forces which may break the mounting arms of the slider bar. Of course, the ends of the slider bar can also be attached to other portions of the vehicle than the sill, for example the floor.

I claim:

1. In an anchorage for a seat belt for use to protect a person sitting in a front seat of a two-door vehicle, said anchorage comprising a slider bar mounted in the interior of the vehicle adjacent and spaced from a door sill of the vehicle and extending in the longitudinal direction of the vehicle, with one end of the seat belt being slidably attached to the bar, so that the end of the belt can slide between a front position, adopted when the seat belt is in use, and a rear position, adopted when the seat belt is not in use; the improvement comprising means, including a portion of said slider bar, for causing the slider bar to be moved towards the sill in response to a vertical component of a downward force from above to which the slider bar is subjected, so that the distance between the slider bar and the sill is reduced.

2. In an anchorage for a seat belt for use to protect a person sitting in a front seat of a two-door vehicle, said anchorage comprising a slider bar mounted in the interior of the vehicle adjacent and spaced from a door sill of the vehicle and extending in the longitudinal direction of the vehicle, with one end of the seat belt being slidably attached to the bar, so that the end of the belt can slide between a front position, adopted when the seat belt is in use, and a rear position, adopted when the seat belt is not in use; the improvement comprising means for causing the slider bar to be moved towards the sill when the slider bar is subjected to a downward force from above, so that the distance between the slider bar and the sill is reduced, and wherein said means includes an upper portion of the slider bar which defines a substantially planar surface, with the planar surface being inclined to the horizontal, and with the normal to the planar surface being directed upwardly and away from the door sill.

3. An anchorage according to claim 2 wherein the planar surface is inclined to the horizontal at an angle of approximately 45°.

4. An anchorage according to claim 1 wherein at least one end of the slider bar is resiliently mounted in position to the vehicle.

5. In an anchorage for a seat belt for use to protect a person sitting in a front seat of a two-door vehicle, said anchorage comprising a slider bar mounted in the interior of the vehicle adjacent and spaced from a door sill of the vehicle and extending in the longitudinal direction of the vehicle, with one end of the seat belt being slidably attached to the bar, so that the end of the belt can slide between a front position, adopted when the seat belt is in use, and a rear position, adopted when the seat belt is not in use; the improvement comprising means, including a portion of said slider bar, for causing the slider bar to be moved towards the sill when the slider bar is subjected to a downward force from above, so that the distance between the slider bar and the sill is reduced, and wherein: at least one end of the slider bar is provided with a supporting arm which is resiliently mounted in position to the vehicle; and means are provided for mounting the at least one supporting arm on the sill such that the supporting arm can tilt towards the sill but cannot tilt away for the sill.

6. An anchorage according to claim 5 wherein: the supporting arm terminates in a ring-shaped element defining an aperture; and the means for mounting includes a bolt having a shank which passes through the aperture to secure the ring-shaped element in position, a projection spacing part of the ring-shaped element from a fixed part of the support, and a resilient element disposed adjacent the ring-shaped element, with the arrangement being such that the ring-shaped element can tilt in one direction, with the resilient element being compressed, to enable the slider bar to move towards the sill, but cannot tilt in the opposite direction due to the effect of the projection.

7. An anchorage according to claim 6 wherein the projection comprises a protuding lip provided on the ring-shaped terminal element of the supporting arm.

8. An anchorage according to claim 5 wherein substantially identical supporting arms are provided at each end of the slider bar.

9. In an anchorage for a seat belt for use to protect a person sitting in a front seat of a two-door vehicle, said anchorage comprising a slider bar mounted in the interior of the vehicle adjacent and spaced from a door sill of the vehicle and extending in the longitudinal direction of the vehicle, with one end of the seat belt being slidably attached to the bar, so that the end of the belt can slide between a front position, adopted when the seat belt is in use, and a rear position, adopted when the seat belt is not in use; the improvement comprising means, includring a portion of said slider bar, for causing the slider bar to be moved towards the sill when the slider bar is subjected to a downward force from above, so that the distance between the slider bar and the sill is reduced, and wherein said means for causing further includes means for mounting the slider bar so that its central axis is positioned between the sill and a vertical plane passing through the point at which the bar is fastened to the vehicle for pivotal movement toward the sill.

10. An anchorage according to claim 1, wherein an upper portion of the door sill is provided with a lip projecting towards the interior of the vehicle and at least partially covering the space between the slider bar and the sill.

11. In an anchorage for a seat belt for use to protect a person sitting in a front seat of a two-door vehicle, said anchorage comprising a slider bar, mounted in the interior of the vehicle adjacent and spaced from a door sill of the vehicle, with said slider bar presenting an elongate portion extending in the longitudinal direction of the vehicle and substantially parallel with the door sill, and with one end of the seat belt being slidably attached to said elongate portion, so that the one end of the belt can slide between a front position, adopted when the seat belt is in use, and a rear position, adopted when the seat belt is not in use, and at least one resilient connection between the said elongate portion of the slider bar and the body of the vehicle; improvement comprising means, responsive to a downward force applied to said elongate portion of the slider bar and including a portion of said slider bar, for generating a resultant force causing said elongate portion of said slider bar to move towards the sill, so that the distance between the elongate portion of the slider bar and the sill is reduced.

12. An anchorage according to claim 11, wherein said means for generating said resultant force includes a substantially planar surface formed on said elongate portion of said slider bar, with said planar surface being inclined to the horizontal, and with the normal to the said planar surface being directed upwardly and away from the door sill.

13. An anchorage according to claim 12, wherein said planar surface is inclined to the horizontal at an angle of approximately 45°.

14. An anchorage according to claim 11, wherein: at least one end of said elongate portion of the bar is provided with a supporting arm; and said at least one resilient connection includes a resilient mounting means for connecting the said supporting arm to the vehicle to enable said slider bar to move towards the sill when the slider bar is subjected to said downward force from above.

15. An anchorage according to claim 14, further comprising engagement means, which engage if the supporting arm tilts away from the sill, for preventing said supporting arm from tilting away from the sill, but which do not engage when said supporting arm tilts towards the sill.

16. An anchorage according to claim 14 wherein: said supporting arm terminates in a ring-shaped element defining an aperture; and said resilient mounting means includes a bolt having a shank which passes through said aperture to secure said ring-shaped element in position to a support on the vehicle, a projection spacing part of said ring-shaped element from a fixed part of said support, and a resilient element disposed adjacent said ring-shaped element, with the arrangement being such that the ring-shaped element can tilt in one direction, with said resilient element being compressed, to enable said slider bar to move towards the sill, but cannot tilt in the opposite direction due to the effect of said projection.

17. An anchorage according to claim 16 wherein said projection comprises a protruding lip provided on said ring-shaped element of said supporting arm.

18. An anchorage according to claim 14 wherein substantially identical supporting arms are provided at each end of said elongate portion of said slider bar.

19. An anchorage according to claim 11, wherein: said elongate portion of said slider bar is mounted for movement about a pivot point spaced from the sill; and the longitudinal axis of the slider bar is positioned between the sill and a vertical plane passing through said pivot point.

20. An anchorage according to claim 11, wherein an upper portion of the door sill is provided with a lip projecting towards the interior of the vehicle and at least partially covering the space between said elongate portion of said slider bar and the sill.

* * * * *